(12) United States Patent
Robic et al.

(10) Patent No.: US 11,767,794 B2
(45) Date of Patent: Sep. 26, 2023

(54) HYBRIDISATION OF THE COMPRESSORS OF A TURBOJET

(71) Applicant: SAFRAN AIRCRAFT ENGINES, Paris (FR)

(72) Inventors: Bernard Robic, Moissy-Cramayel (FR); Thierry Jean-Jacques Obrecht, Moissy-Cramayel (FR); Baptiste Jean Marie Renault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 287 days.

(21) Appl. No.: 15/500,792

(22) PCT Filed: Aug. 4, 2015

(86) PCT No.: PCT/FR2015/052152
§ 371 (c)(1),
(2) Date: Jan. 31, 2017

(87) PCT Pub. No.: WO2016/020618
PCT Pub. Date: Feb. 11, 2016

(65) Prior Publication Data
US 2017/0226934 A1 Aug. 10, 2017

(30) Foreign Application Priority Data

Aug. 8, 2014 (FR) ...................................... 1457703

(51) Int. Cl.
*F02C 7/00* (2006.01)
*F02C 7/32* (2006.01)
(Continued)

(52) U.S. Cl.
CPC .................. *F02C 7/32* (2013.01); *F02C 7/36* (2013.01); *F02K 3/06* (2013.01); *F05D 2220/76* (2013.01); *Y02T 50/60* (2013.01)

(58) Field of Classification Search
CPC .... F02C 7/32; F02C 7/36; F02C 7/275; F02C 3/107; F02C 3/113; F02C 6/14;
(Continued)

(56) References Cited

U.S. PATENT DOCUMENTS 2,576,352 A * 11/1951 Neal .......................... F02C 9/16
60/39.281
4,275,557 A * 6/1981 Marvin ..................... F02C 9/28
60/773
(Continued)

FOREIGN PATENT DOCUMENTS

EP 1 785 614 A2 5/2007
EP 2 584 173 A1 4/2013
(Continued)

OTHER PUBLICATIONS

International Search Report dated Nov. 17, 2015, issued in corresponding International Application No. PCT/FR2015/052152, filed Aug. 4, 2015, 7 pages.
(Continued)

*Primary Examiner* — Edwin Kang
(74) *Attorney, Agent, or Firm* — CHRISTENSEN O'CONNOR JOHNSON KINDNESS PLLC

(57) ABSTRACT

A twin-flow, double body turbojet includes a fan that is positioned upstream from a gas generator and delimits primary and secondary flows. The gas generator is traversed by the primary flow and includes a low-pressure compressor, a high-pressure compressor, a combustion chamber, a high-pressure turbine and a low-pressure turbine. The low-pressure turbine is linked to the low-pressure compressor by a low-pressure rotating shaft, and the high-pressure turbine is linked to the high-pressure compressor by a high-pressure rotating shaft. The turbojet has an electric motor for injecting mechanical power into at least one of the rotating shafts. The turbojet also has a device for removing power from at
(Continued)

least one of the rotating shafts and transforming the excess power into electrical energy. An electric storage means is positioned between the device for removing power and the electric motor.

10 Claims, 6 Drawing Sheets

(51) Int. Cl.
    *F02K 3/06*     (2006.01)
    *F02C 7/36*     (2006.01)

(58) Field of Classification Search
    CPC .............. F02K 3/06; F05D 2220/76; F05D 2260/4023; F05D 2260/60; Y02T 50/671; B60K 6/28
    See application file for complete search history.

(56) References Cited

U.S. PATENT DOCUMENTS

| | | | |
|---|---|---|---|
| 5,694,765 A | 12/1997 | Hield et al. | |
| 5,867,979 A | 2/1999 | Newton et al. | |
| 6,070,412 A * | 6/2000 | Ansart | F23R 3/34 60/747 |
| 7,285,871 B2 | 10/2007 | Derouineau | |
| 7,481,062 B2 | 1/2009 | Gaines et al. | |
| 7,513,120 B2 | 4/2009 | Kupratis | |
| 7,552,582 B2 | 6/2009 | Eick et al. | |
| 8,201,414 B2 | 6/2012 | Haehner et al. | |
| 2008/0072568 A1* | 3/2008 | Moniz | F01D 15/10 60/226.1 |
| 2009/0289456 A1* | 11/2009 | McLoughlin | F01D 15/10 290/46 |
| 2010/0126178 A1* | 5/2010 | Hyde | B64D 27/24 60/767 |
| 2011/0154827 A1 | 6/2011 | Ress, Jr. et al. | |
| 2012/0000204 A1* | 1/2012 | Kesseli | F02C 3/107 60/778 |
| 2012/0221157 A1* | 8/2012 | Finney | G06F 1/26 700/287 |
| 2014/0360205 A1* | 12/2014 | French | H02J 9/061 60/786 |
| 2016/0023773 A1* | 1/2016 | Himmelmann | H02M 5/458 60/778 |

FOREIGN PATENT DOCUMENTS

| | | |
|---|---|---|
| EP | 2 604 827 A2 | 6/2013 |
| EP | 2 728 141 A2 | 5/2014 |
| FR | 2 914 697 A1 | 10/2008 |

OTHER PUBLICATIONS

Written Opinion of the International Searching Authority dated Nov. 17, 2015, issued in corresponding International Application No. PCT/FR2015/052152, filed Aug. 4, 2015, 6 pages.
Written Opinion of the International Searching Authority dated Nov. 17, 2015, issued in corresponding International Application No. PCT/FR2015/052152, filed Aug. 4, 2015, 8 pages.
International Preliminary Report on Patentability dated Feb. 14, 2017, issued in corresponding International Application No. PCT/FR2015/052152, filed Aug. 4, 2015, 1 page.
Notice of opposition to a European patent dated Apr. 15, 2021 issued in corresponding European Patent No. EP3177820.
European Opposition Statement issued in corresponding European Patent No. EP3177820 dated Apr. 15, 2021.

\* cited by examiner

HYBRIDISATION OF THE COMPRESSORS OF A TURBOJET

FIELD OF THE INVENTION

The field of the invention is that of aeronautical turbine engines, and in particular that of aircraft engines produced in the form of twin-spool bypass turbojet engines having a high bypass ratio.

PRIOR ART

The design of modern turbojet engines requires taking into account a sufficient margin against the phenomenon known as surge for sizing the compressors thereof. This phenomenon, which results from an excessive incidence of the airflow on the blades of one of the compressors, results in large and rapid fluctuations in the pressure downstream of the compressor in question and may lead to extinction of the combustion chamber. It also generates strong jolts on the bladings of the compressor and may thus lead to mechanical damage. It is therefore particularly necessary to avoid the appearance thereof. The operation of a compressor in use is generally represented by a diagram that expresses the pressure ratio obtained between the outlet and the inlet, as a function of the airflow passing through it; this diagram is also parameterised as a function of the rotation speed of the compressor. In this diagram, a surge line appears that constitutes the maximum limit in terms of compression ratio that must not be exceeded, in order not to risk the appearance of surge. A so-called operating line is defined, which gives the compression ratios obtained as a function of the flow rate, when the engine is in stable operation. The positioning of this operating line is left to the assessment of the designer of the turbine engine and the distance of this line from the surge line represents the surge margin.

It should be noted that the efficiency of the compressor (compression work supplied to the air, in relation to the work supplied to rotate it) is, as a first approximation (and this will be explained in more detail in the remainder of the description), better as the surge line is approached. On the other hand, the accelerations required by the pilot from stable operation in order to obtain an increase in thrust result, at the compressor, in an excursion of the operating point that takes place in the direction of the surge line. This is because an additional feeding-in of fuel in the combustion chamber causes an almost instantaneous increase in the compression ratio, while the rotation speed does not have the time to increase because of the inertia of the rotor which carries the compressor. The variation in enthalpy given to the fluid by the combustion of the added fuel then causes an increase in the work supplied by each turbine and consequently an increase in the rotation speed of the corresponding body. This results, at the compressor diagram, in a return of the operating point on the operating line, when the speed once again stabilises, to a point that corresponds to a higher flow rate than that of the previous point.

The designer of a turbine engine must therefore attempt to optimise the placing of the operating line by placing it as high as possible, so as to benefit from better efficiency for his compressors, while keeping sufficient distance vis-à-vis the surge line to allow safe accelerations.

DISCLOSURE OF THE INVENTION

The aim of the present invention is to overcome these drawbacks by proposing a device for optimising the surge margin of the compressor so as to reduce the constraints on the designers of turbine engines. Another aim of the present invention is to improve the operation of the turbojet engine in the in-flight idle phase.

To this end, the subject matter of the invention is a twin-spool bypass turbojet engine comprising a fan positioned upstream from a gas generator and delimiting a primary flow and a secondary flow, said gas generator having the primary flow pass through it and comprising a low-pressure compressor, a high-pressure compressor, a combustion chamber, a high-pressure turbine and a low-pressure turbine, said low-pressure turbine being connected to said low-pressure compressor by a low-pressure rotating shaft and said high-pressure turbine being connected to said high-pressure compressor by a high-pressure rotating shaft, characterised by the fact that said turbojet engine comprises an electric motor forming a device for applying mechanical power to at least one of said rotating shafts, a device for drawing power from at least one of said rotating shafts, sized so as to extract excess power relative to the requirement for actuating the auxiliary systems of the turbojet engine, transforming said excess power into electrical energy, and an electricity storage means positioned between the power take-off device and said electric motor.

A power application device comprises a power application shaft that meshes by any suitable means on the rotation shaft in question and is driven by a drive element able to provide additional power to this shaft.

An application of power, in particular to the HP (high pressure) shaft, makes it possible to improve both the surge margin of the LP (low pressure) compressor and that of the HP compressor. This margin, accessible during the use of the device, allows the turbojet engine to operate at a stable speed with reduced margins and therefore to benefit from the better efficiency of the compressor.

Advantageously, the turbojet engine comprises a device for drawing power from at least one of its rotation shafts, sized so as to extract excess power compared with the requirement for actuation of the auxiliary systems of the turbojet engine.

This device makes it possible to power the aforementioned power application device.

The power application device and the power take-off device may be separate or formed from a single reversible device.

More preferentially, the electric motor is connected to said power take-off device and meshes on the rotation shaft or shafts in order to provide said application of power.

Advantageously, the electricity storage means is positioned in parallel between said power take-off device and said electric motor. This means serves as a buffer in the electrical energy production and supply circuit.

In a particular embodiment, the power is applied to the high-pressure shaft. This is a configuration that is more favourable from the point of view of operability, that is to say from the point of view of accelerations that are permissible by the engine, since it provides an improvement to the surge margin of both the LP compressor and the HP compressor.

Advantageously, the aforementioned turbojet engine further comprises a device for drawing power from the low-pressure shaft sized so as to extract excess power with respect to the requirement for actuation of the auxiliary systems of the turbojet engine. In a particular use, the power is applied at a rotation speed of the high-pressure body greater than or equal to 80% of its rotation speed at full throttle. The operation of the engine at high speed, and in particular during cruising, can then take place with reduced margins and benefit from optimisation of the positioning, with regard to efficiency, of the operating line in the compressor field. The application of power may also aim at stabilised points under conditions where the compressor has a low margin in order to design a compressor with a lower margin except for power application and thus to benefit from better efficiency on operational points without continuous application of power.

In another use, the power is applied at in-flight idling speed. This makes it possible to reduce the quantity of fuel fed in, while keeping rotation speeds compatible with normal use of the engine, while preserving safety conditions for rapid re-acceleration of the engine and re-ignition thereof should it be shut down.

Preferentially, the turbojet engine further comprises a device for disconnection between the low-pressure shaft and the shaft driving the fan and comprises a device for drawing power from the shaft driving the fan connected to said power application device on the high-pressure shaft.

In a particular use, the power is applied in the mode when the disconnection device is disconnected. Power is drawn from the fan by means of a device for reversing the blade pitch in order to put the fan in turbine mode and to re-apply this power to the HP body in order to maintain a normal operating mode for it.

In another particular embodiment, the power is applied to the low-pressure shaft.

PRESENTATION OF THE FIGURES

The invention will be understood better and other aims, details, features and advantages thereof will become clearer during the following detailed explanatory description of a plurality of embodiments of the invention that are given by way of purely illustrative and non-limitative examples in relation to the accompanying schematic drawings.

DETAILED DESCRIPTION OF THE INVENTION

Figure 1:
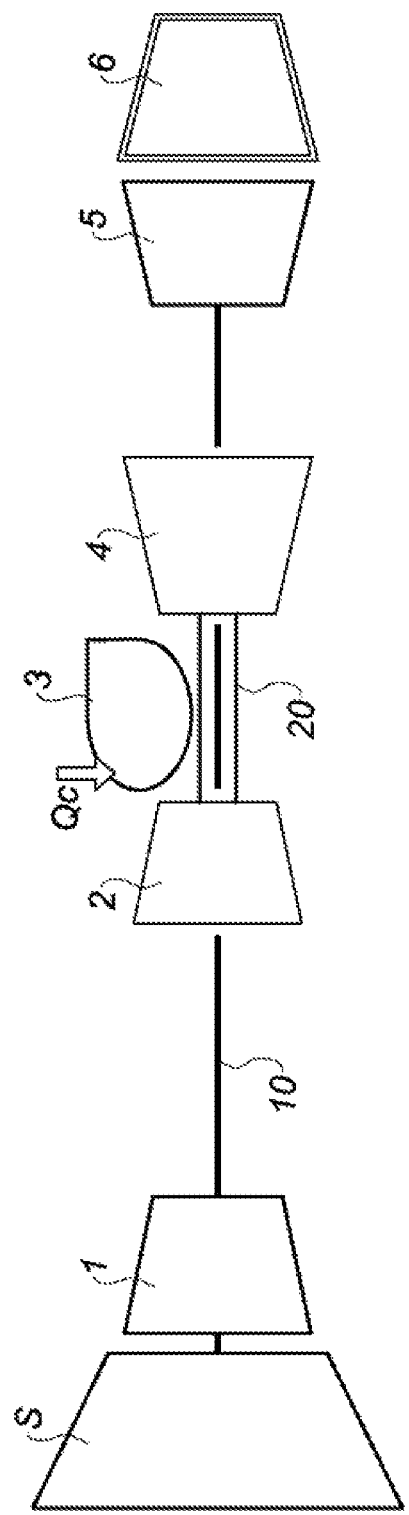
FIG. 1 is a generic view of a twin-spool bypass turbojet engine.

FIG. 1 is a generic view of a fan twin-spool bypass turbojet engine. It comprises conventionally, from upstream to downstream in the direction of flow of the gases, a fan S, a low-pressure compressor 1, a high-pressure compressor 2, a combustion chamber 3 that receives a flow of fuel Qc, a high-pressure turbine 4, a low-pressure turbine 5 and a primary exhaust pipe 6. The low-pressure (or LP) compressor 1 and the low-pressure turbine 5 are connected by a low-pressure shaft 10 and together form a low-pressure body. The high-pressure (or HP) compressor 2 and the high-pressure turbine 4 are connected by a high-pressure shaft 20 and together form, with the combustion chamber, a high-pressure body.

The fan S, which is driven, either directly or by means of a reducer, by the LP shaft 10, compresses the air coming from the air inlet sleeve. This air is divided, downstream of the fan, between a secondary airflow that is directed directly to a secondary nozzle (not shown), through which it is ejected in order to assist with the thrust supplied by the engine, and a so-called primary flow that enters the gas generator, formed by the low- and high-pressure bodies and which is then ejected into the primary nozzle 6. The invention also covers the case where the two flows, primary and secondary, are mixed before ejection.

Figure 2:
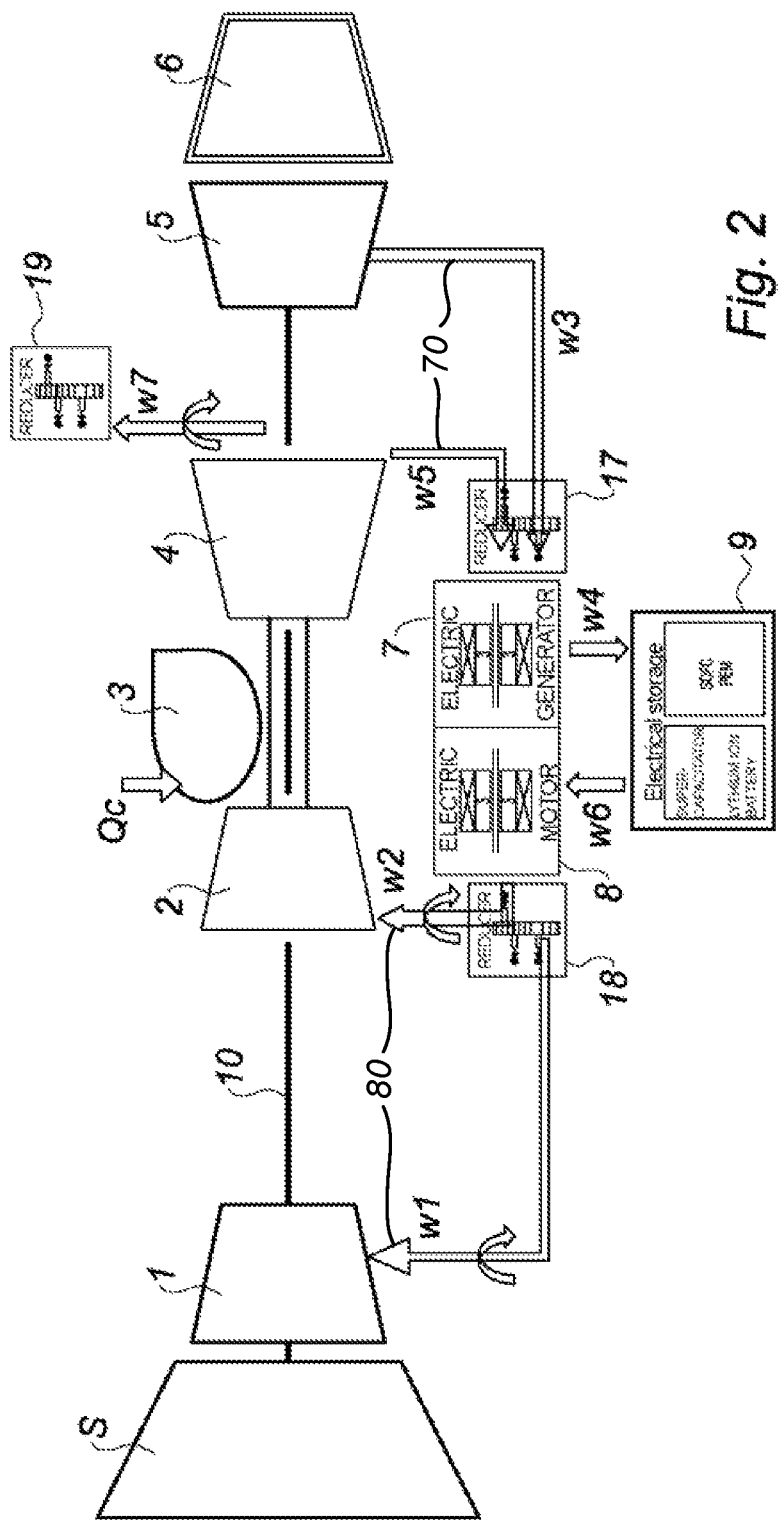
FIG. 2 is a generic view of a turbojet engine equipped with devices for improving the management of the surge margin, according to the invention.

FIG. 2 depicts a twin-spool bypass turbojet engine according to the invention, the mechanical power being drawn from one or both shafts of the turbojet engine by means of power take-offs (such as a power take off device 70). These power take-offs are generally mounted on the shaft from which they draw the power and attached to a reducer 17 for reducing their rotation speed to values compatible with the operation of the equipment that they drive.

The diagram in FIG. 2 attempts to illustrate all conceivable cases of drawing power from the shafts of a twin-spool bypass turbojet engine, without this corresponding to any particular use, practical cases then being detailed in relation to the following figures.

With regard to the LP body, a power with a value w3 is taken off, by means of a power take-off, whether at the turbine, as shown in FIG. 2, or at any other point on the LP shaft 10, by an LP power extraction shaft (not shown). This LP power extraction shaft ends at the reducer 17, which is itself connected to an electricity generator 7 that transforms the energy w3 received into electrical energy. Said electrical energy can, as shown in FIG. 2, be stored in an electrical storage means 9 or, as will explained in the use cases in the following figures, be sent directly, by an electric power-ejection motor 8, to one of the shafts of the turbojet engine.

The electrical storage means 9 may conventionally be of the lithium-ion battery, supercapacitor or fuel cell type. The energy produced by the electricity generator 7 and supplied to this electrical storage means 9 is designated by the reference sign w4.

In the same way a power w5 can be drawn from the HP body, whether at the turbine as shown in the figure or at any other point on the HP shaft 20. It is, there also, extracted by an HP power extraction shaft (not shown) by means of a power take-off mounted on this shaft. The HP power extraction shaft ends at a reducer 17, shown here for simplification as the same as that of the LP power extraction shaft. As before the reducer 17 is connected to an electricity generator 7 that converts the mechanical energy w5 received into electrical energy w4.

Moreover, mechanical power w7 is conventionally taken off in order to drive the accessories of the engine and to provide mechanical power to the aircraft, by means of a gearbox known as an accessory gearbox 19.

The power drawn from one or both shafts, whether or not it be stored, is intended according to the invention to be reapplied to one or both shafts by means of the following devices:

An electric motor 8 is supplied with electric current either directly by the electricity generator 7 or by the storage device 9, and supplies mechanical power to a power application shaft (such as a power application device 80) that meshes on one or both shafts of the turbojet engine through a reducer 18. The mechanical power delivered to the LP shaft 10 is designated by the reference sign w1 and that delivered to the HP shaft 20 is designated by the reference sign w2.

Figure 3:
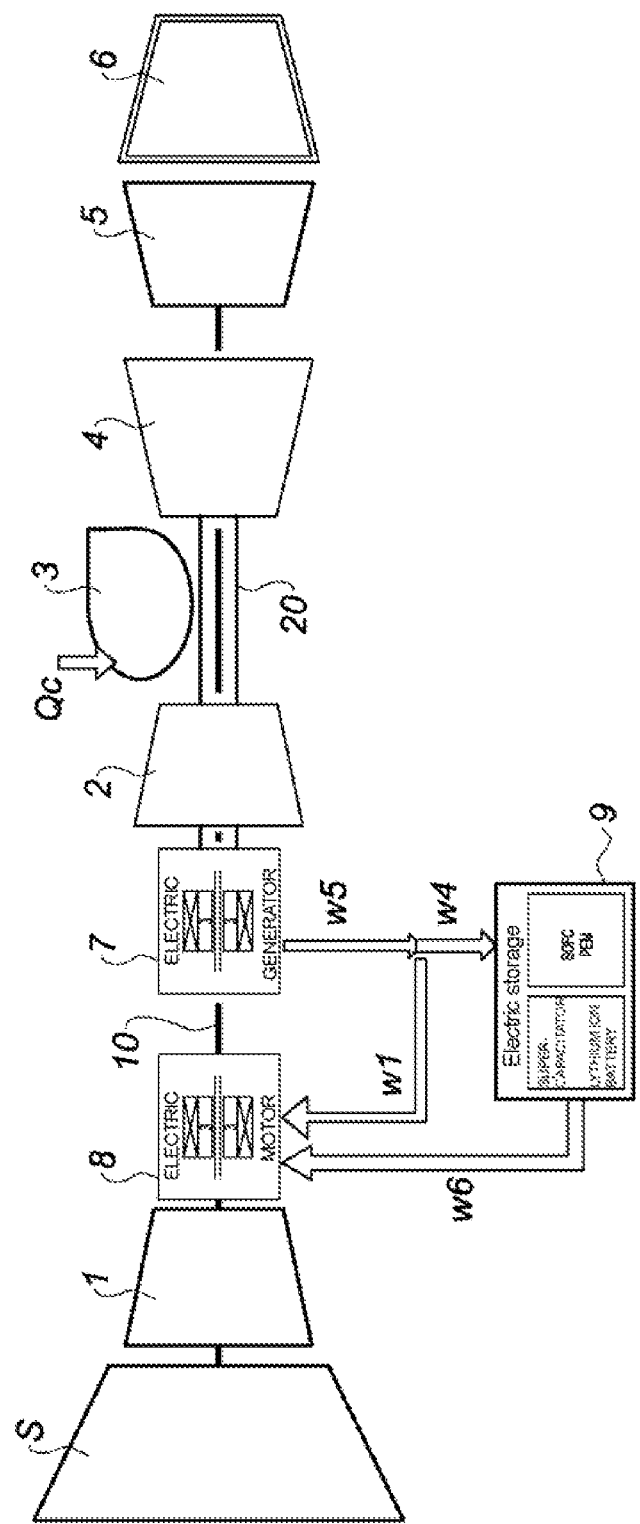
FIG. 3 is a generic view of a turbojet engine equipped with improvement devices used on the low-pressure compressor.

Referring now to FIG. 3, an embodiment of the invention in which the power is applied mechanically to the LP shaft 10 can be seen.

The electricity generator 7 is here driven by the HP shaft 20, from which it draws a power w5. The latter is, in operation, sent to the electric motor 8, which is coupled mechanically to the LP shaft 10. The power w5 is distributed between a value w1 chosen by the designer of the turbojet engine for improving the performance of the operating point in question and a value w4 that is sent to the storage means 9. The latter thus acts as a buffer in the circuit supplying energy to the shaft in question.

Figure 4:
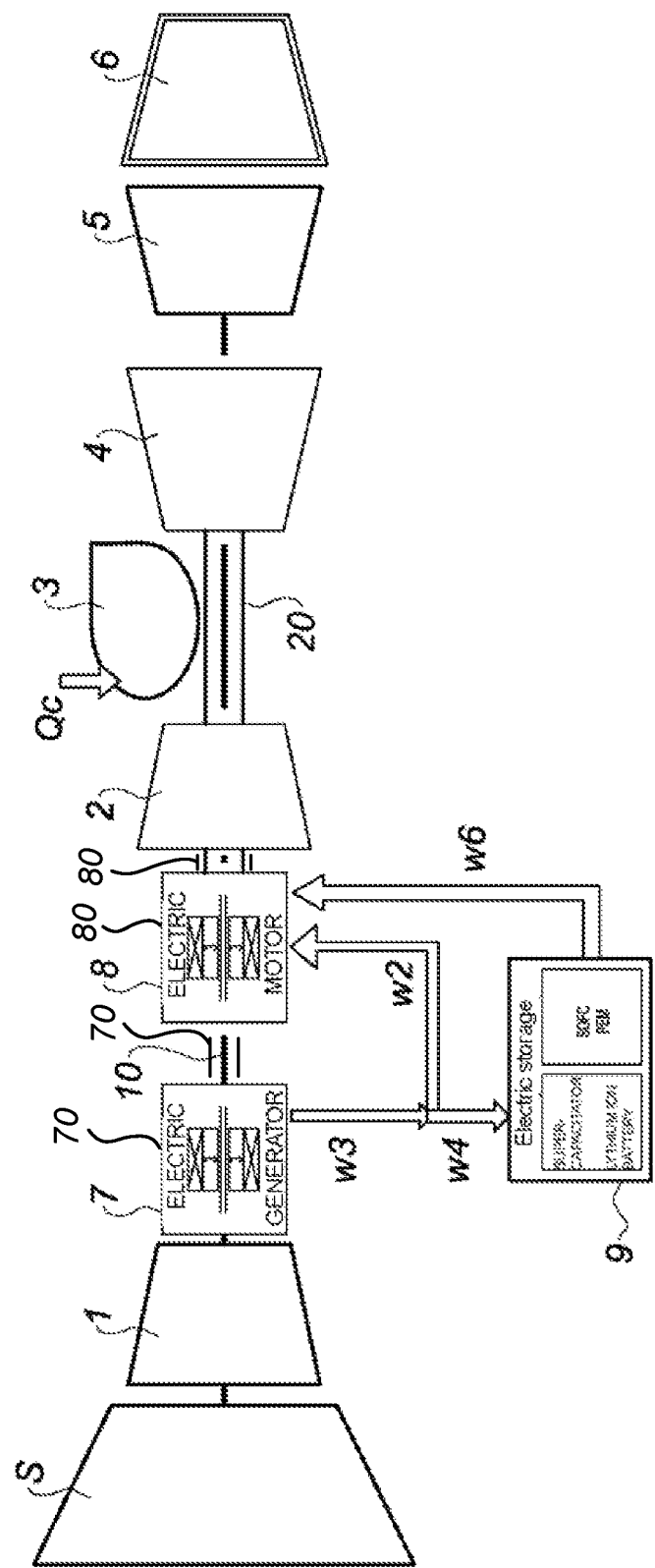
FIG. 4 is a generic view of a turbojet engine equipped with improvement devices used on the high-pressure compressor.

Similarly, FIG. 4 shows an embodiment in which the power is applied mechanically to the HP shaft 20.

The electricity generator 7 is here driven by the LP shaft 10, from which it draws a power w3. The latter is, in operation, sent to the electric motor 8, which is coupled mechanically to the HP shaft 20. The power w3 is distributed between a value w2 chosen by the designer of the turbojet engine for improving the surge margin at the operating point in question and an excess value w4 that is sent to the storage means 9 in the case where the power supplied is greater than the power requirement of the HP shaft. In the contrary case, that is to say if the power w3 that can be drawn from the LP shaft is insufficient since it is less than the w2 sought, there is de-storage of a quantity of energy w6 from the storage means 9 and transmission of this energy to the electric motor 8.

Figure 5:
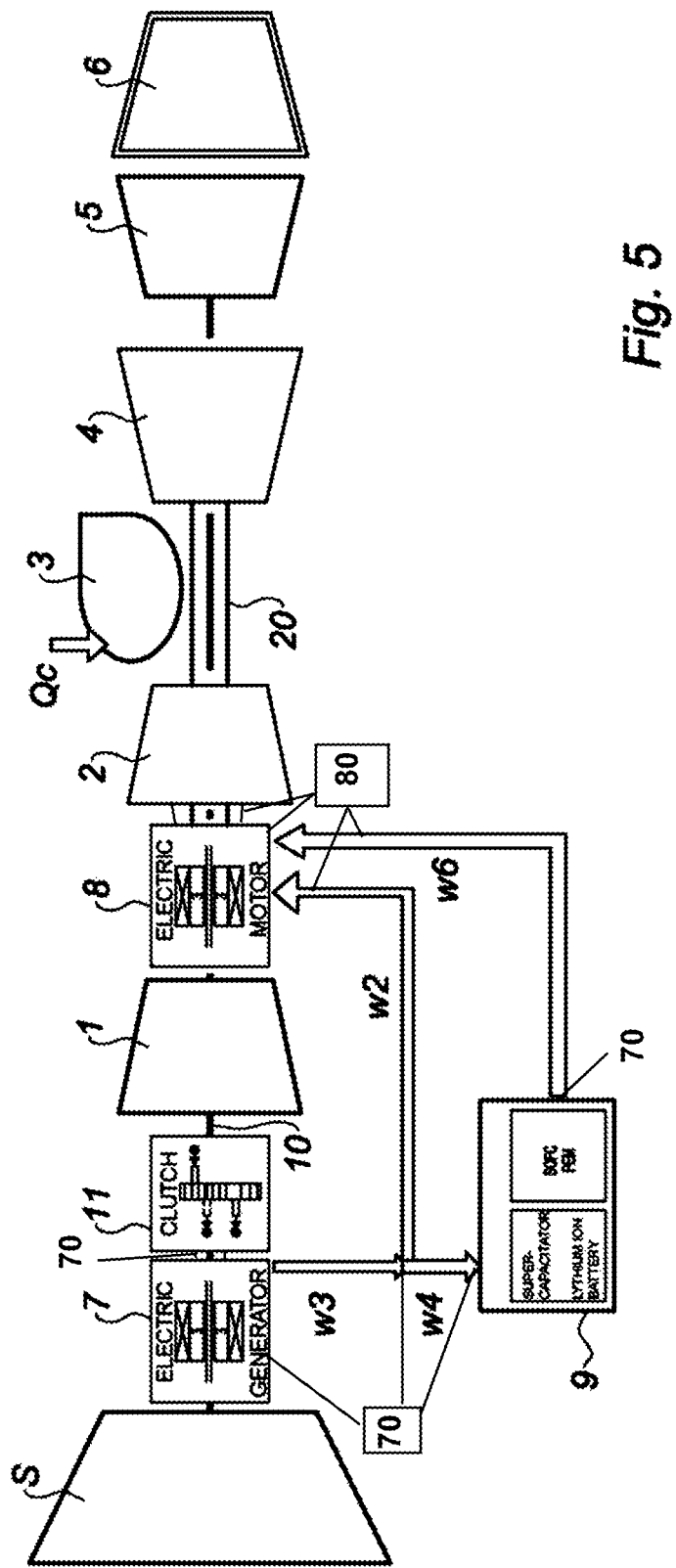
FIG. 5 is a generic view of a turbojet engine equipped with devices for improving management of in-flight idling and in autorotation mode.

FIG. 5 shows a particular case of application of power to the HP shaft, the electricity generator 7 being inserted on the LP shaft 10 between the LP compressor 1 and the fan S. An engagement and disengagement device 11 is installed between the LP compressor 10 and the fan S to allow operation of the fan in autorotation, and the electricity generator is driven from a power take-off that is located on the same side as the shaft of the fan. This configuration is used, for example, in the case of in-flight idling operation or switching off of the turbojet engine, the fan then providing the production of electrical energy by means of its autorotation.

In this configuration, the electricity generator 7 is driven by the fan shaft, which is disconnected from the LP shaft 10. The power w3 that it draws from the fan shaft is sent to the electric motor 8, which is mechanically coupled to the HP shaft 20. As in the previous case, the power w3 is distributed between a value w2 that is applied to the HP shaft 20 in order to provide rotation thereof and optionally to allow re-ignition of the combustion chamber, and an excess value w4 that is sent to the storage means 9. As required, if the power w3 is insufficient, there is de-storage of a quantity of energy w6 from the storage means 9 and transmission of this energy to the electric motor 8 for the application of supplementary power to the HP shaft.

Figure 6:
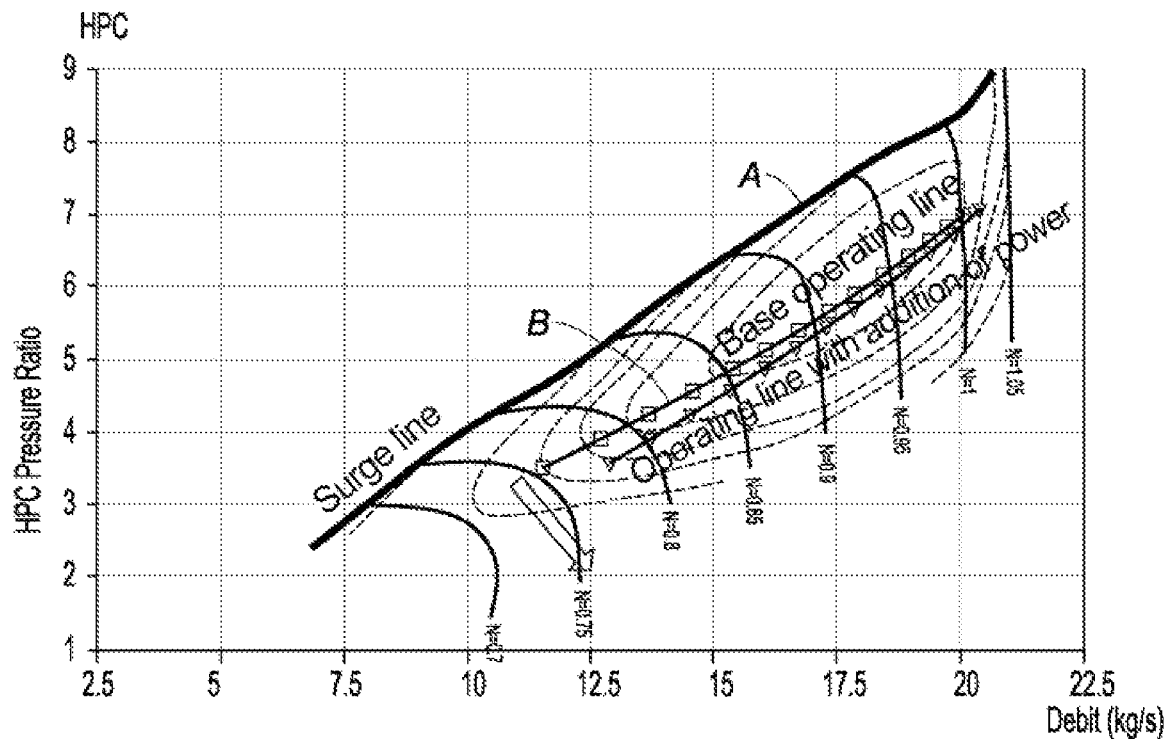
FIG. 6 is a view of the operating diagram of a high-pressure compressor of a turbojet engine.

FIG. 6 shows the diagram of the HP compressor of a twin-spool bypass turbojet engine equipped with a device according to the invention for applying power to the HP shaft.

This diagram conventionally gives the change in the compression ratio delivered by the compressor as a function of the flow rate passing through it and is parameterised according to its rotation speed, which is expressed as a percentage of the rotation speed at take-off. According to the operating parameters of the engine, the point representing the operation of the compressor moves in this diagram while remaining below the surge line A, which for its part is a characteristic of the compressor.

It is noted, conventionally, on this diagram that the isoefficiency curves of the compressor have an oval form, the major axis of which is aligned substantially in parallel with the surge line. The line B that connects the best-efficiency points then constitutes an optimum for the positioning of the operating line. On the other hand, such a positioning procures a surge margin that is generally insufficient and it is usual in the prior art to shift this line downwards in order to operate with acceptable margins, to the detriment of the efficiency of the compressor and therefore the specific consumption of the turbojet engine.

The invention therefore proposes to position this operating line optimally with regard to the efficiency of the compressor, that is to say with surge margins that are certainly reduced, but to associate them with the use, on demand, of a power application device, which, for the time necessary, gives rise to an increased surge margin, as will be explained in relation to FIG. 7.

Throughout the time when this device is used, the operating line is shifted downwards into the position, in an operating line position with increased margin C.

Figure 7:
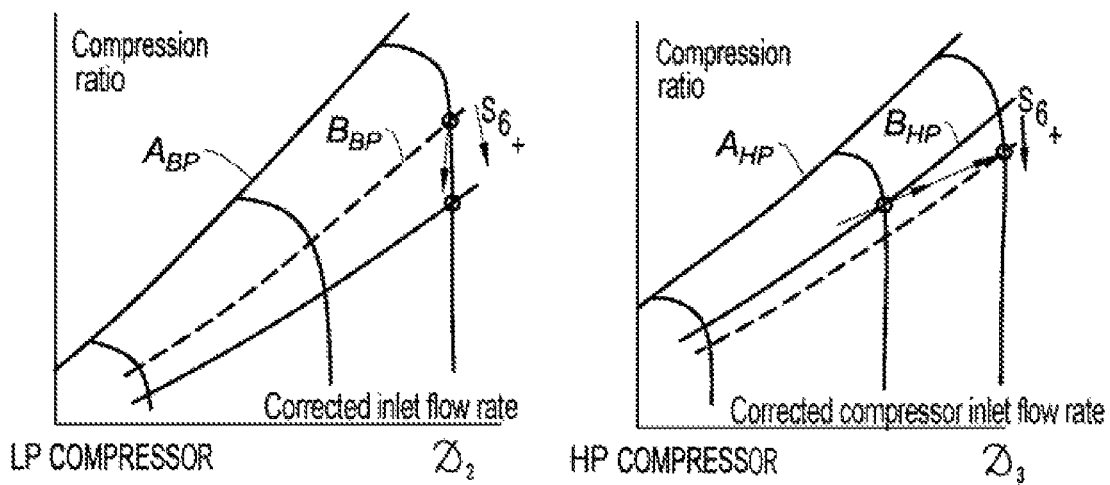
FIG. 7 is a view of the operating diagrams of the LP and HP compressors during an application of power to the HP shaft.

FIG. 7 shows the influence in the LP and HP compressor fields of an application of power to the HP shaft, at high speed (that it is to say in practice at a rotation speed greater than or equal to 80% of the rotation speed at full throttle) and the impact that it has on the positioning of the operating line of the engine in each of these fields.

At high speeds the flow of gases in the gas generator is characterised by two sonic throats, which are positioned in one case at the HP turbine nozzle and in the other case in the cross section of the primary nozzle. This results aerodynamically in a blockage of the flow at these two points and therefore in a preservation of the load of both of two turbines, whatever the changes made on the cycle upstream of these points, provided that the same global compression ratio is maintained (the ratio between the pressure at the outlet of the HP compressor and the inlet of the LP compressor) and the same temperature at the outlet of the combustion chamber.

An application of pressure to the HP shaft, which has the same practical effects as an opening of the cross section S6 of the LP nozzle, then ipso facto causes a reduction in the load of the LP turbine.

With the load of the LP turbine decreasing, this results, in its compressor field, in a reduction, at constant speed, of the LP compression ratio and therefore a moving of the operating line $B_{BP}$ away from the surge line $A_{BP}$ (cf. left-hand figure). This moving away takes place at constant rotation speed and therefore substantially perpendicular to the surge line. The application of power to the HP shaft is consequently beneficial with regard to improving the surge margin of the LP compressor.

With regard to the HP compressor, its load increases but, the cross section of the HP nozzle being blocked downstream, the operating line moves to the right, at a substantially constant compression ratio. Because of the rising trend of the operating line, this movement to the right results in a moving of the operating point $B_{HP}$ away from the surge line $A_{HP}$ and therefore an increase in the corresponding margin of the HP compressor (see right-hand figure).

Finally, with regard to the operation of the fan, which is not subjected to the phenomenon of flow blockage, its operating line does not move substantially and the same speed prevails as in the absence of the application of power.

The gains afforded by the invention at high speeds have been evaluated and are as follows, for an application of a power of 500 horsepower at high speed, to the HP shaft:

a gain of 1.7% on the surge margin of the LP compressor at take-off speed,
a gain of 1.4% on the surge margin of the HP compressor, and
a minimal gain of 0.07% on the surge margin of the fan.

Finally it can be seen that an application of power to the HP shaft produces an improvement in the margins both on the HP compressor and on the LP compressor. A turbojet engine designer can therefore, by providing a power application device, position the operating lines of the two compressors thereof closer to the line of the surge line than in the prior art and thus benefit from the optimum efficiency thereof. The reduction in the surge margin that is associated therewith is compensated by an actuation on demand of an application of power to the HP shaft, for example when the pilot requests an increase in thrust.

An application of power to the HP shaft can also be envisaged at other operating speeds of the turbojet engine and in particular when the fan functions in autorotation during descent or at in-flight idling speed.

The fan autorotation regime, by disconnecting it from the LP body by means of an engagement/disengagement device 11, as described in relation to FIG. 5, makes it possible to recover the energy associated with the speed of the aircraft and to use this energy for charging the electrical storage means 9 with a view to subsequent use for improving the surge margins or assisting in-flight idling. This configuration may also make it possible to recharge any other electrical storage means that may be on the aircraft.

With regard to assistance in in-flight idling, it should be noted that this phase of the cruising of an aircraft consumes fuel because, despite the search for the lowest thrust possible, it is necessary to provide a minimum rotation speed at the HP and LP bodies. Failing this the combustion chamber runs the risk of being extinguished. All this requires keeping a relatively high in-flight idling speed and therefore, in the prior art, consuming fuel for this purpose. It is desirable to reduce this consumption, provided that the reduction in residual thrust that is associated therewith does not give rise to the need to prolong the cruising excessively. Subject to an assessment of the global gain on consumption during a flight, adding an application of power to the HP shaft can constitute an advantageous solution for reducing the fuel requirement in in-flight idling and attempting to improve the fuel consumption of an aircraft.

In descent, in in-flight idling, a certain number of functions must remain provided by the engine or engines of an aircraft, namely:

keeping a minimum richness in the fuel consumption to avoid a so-called "lean" extinction, through insufficiency of fuel compared with the airflow passing through it,
keeping a minimum speed to allow reacceleration of the engine if it is requested by the pilot, and
delivering pressurisation to the aircraft and therefore maintaining a rotation speed of the HP and LP shafts that provide a minimum static pressure level at the output of the HP compressor (or at the very least at the compression stage where the air take-off tapping is located).

An application of power to the HP shaft by means of an electric motor 8, such as the one installed to improve the surge margins at high speeds, makes it possible, by providing some of the power that is necessary for fulfilling the above three functions, to reduce the power supplied by a combustion of fuel and therefore the quantity of fuel that is fed in during in-flight idling. Finally, the two LP and HP bodies turn at rotation speeds similar to those of the prior art, but with a reduced fuel consumption.

The energy efficiency of the combustion at idling speed being relatively low, in comparison with its efficiency at high speeds (that is to say where the electrical storage means 9 is generally recharged), a supply of power by the electric motor 8 combined with a reduction in power supply by the gas generator is beneficial for the total energy balance. The invention thus makes it possible to improve the consumption of an aircraft during a flight without its being necessary to introduce additional devices, these being already installed for improving the surge margins of the compressors.

The invention therefore relates to a device for applying a certain amount of power to one of the shafts of the turbojet engine, this power being able to be drawn directly from one or both shafts, or be restored from an electrical energy storage means that receives this energy from a generator driven by at least one of said shafts.

The impact of the drawing power from and applying power to the various shafts can be summarised as follows:

The case of supplying power to the HP shaft:
It improves the margin of the HP and LP compressors and thus makes it possible to position the operating line of the engine in the compressor fields closer to the surge line than before and to benefit from better efficiency.
It makes it possible to reduce the thrust in in-flight idling and thus to reduce the total consumption of fuel over a flight.

The case of supplying power to the LP shaft:
It degrades the surge margin of the LP compressor,
but it affords a reduction in the fuel consumption at constant thrust since the latter is partly produced by the system for applying power to the shaft.

The case of drawing power from the HP shaft (in addition to the normal drawing of power w7 for the auxiliary systems):
It allows the storage of energy for subsequent uses, this storage being effected at operating points at a sufficient distance from the surge line,
on the other hand it degrades the surge margin of the HP compressor, when it is used.

The case of drawing power from the LP shaft:
it allows the storage of energy for subsequent uses, without detriment to the surge margin of the compressors, both HP and LP,
it increases the surge margin of the LP compressor but to the detriment of the thrust or the specific consumption of the engine,
it allows recovery of energy on the LP shaft during descent, by virtue of the fan autorotation effect.

The case of drawing power from one shaft and a simultaneous supply of this power to the other:
it allows electrical coupling of the two shafts in descent (taking from the LP shaft and adding to the HP shaft in order to avoid chamber extinctions),
it allows coupling of the two shafts for better control of the acceleration of the two bodies and better management of their rotation speeds.

Finally, it can be seen that the most favourable configurations, without the others falling outside the scope of the invention, consist of drawing power from the LP shaft and applying power to the HP shaft. This configuration makes it possible firstly to improve the surge margins of the two compressors at the high speeds, which allows a positioning of the operating line closer to the best efficiencies, and secondly to reduce the quantity of fuel necessary in in-flight idling, which is beneficial for the total consumption during a flight.

The variation in electrical power of the on-board system of an aircraft due to a need on the auxiliary systems for a more electrical aircraft results in a current surge that can be detected and the value of the signal of which with respect to defined thresholds can serve to adjust the balances between the gas generator and the electric motor by varying the control laws of the FADEC system. This system may comprise a power electronics management part, which addresses the control of the speeds of the electric motor, and a thermal management part, which addresses the control laws of the thermal part of the engine (the gas generator). This system may comprise the hybrid control laws of the mode combinations of the devices, which are translated by the aforementioned management parts of the system into respective instructions. The system may also be one and the same box integrating all the laws, and this according to the history of the gas generator that is hybridised or of the turboprop engine designed to be hybrid from the outset.

The invention claimed is:

1. A twin-spool bypass turbojet engine comprising a fan positioned upstream from a gas generator and delimiting a primary flow and a secondary flow, the gas generator having the primary flow pass through the gas generator and comprising a low-pressure compressor, a high-pressure compressor, a combustion chamber, a high-pressure turbine and a low-pressure turbine,
the low-pressure turbine being connected to the low-pressure compressor by a low-pressure shaft and the high-pressure turbine being connected to the high-pressure compressor by a high-pressure shaft,
wherein the turbojet engine further comprises an electric motor configured to supply an applied mechanical power to at least one of the low-pressure and high-pressure shafts through a power application device, and an electric generator configured to draw an extracted mechanical power from at least one of the low-pressure and high-pressure shafts through a power take-off device,
wherein the power take-off device is sized to extract an excess mechanical power of the extracted mechanical power for actuating at least one auxiliary system of the turbojet engine, the electric generator transforming the excess mechanical power into an electrical energy,
wherein the electrical energy is transformed into the applied mechanical power by the electric motor for actuating at least one of the low-pressure and high-pressure shafts,
wherein an electricity storage device is operably connected to the power take-off device and the electric motor, the electric storage device being configured to store the electrical energy,
wherein the excess mechanical power being drawn by the power take-off device from the low-pressure shaft and the applied mechanical power being supplied to the high-pressure shaft by the power application device during an operation of the turbojet engine,
wherein a first portion of the low-pressure shaft is selectively coupled to a fan driveshaft which is a second portion of the low-pressure shaft to provide a coupled state and an uncoupled state, the power take-off device being configured to draw a fan mechanical power from the fan driveshaft when the first portion of the low-pressure shaft and the fan driveshaft are in the uncoupled state, and
wherein the fan mechanical power is applied to the high-pressure shaft when the first portion of the low-pressure shaft and the fan driveshaft are in the uncoupled state.

2. The twin-spool bypass turbojet engine according to claim 1, wherein the electric motor is connected to the power take-off device and meshes on at least one of the low-pressure shaft and the high-pressure shaft through the power application device to provide the applied mechanical power during a normal operation of the turbojet engine.

3. The twin-spool bypass turbojet engine according to claim 2, wherein the electricity storage device is connected in parallel between the power take-off device and the electric motor.

4. The twin-spool bypass turbojet engine according to claim 1, wherein the applied mechanical power is performed at a rotation speed of the high-pressure shaft greater than or equal to 80% of a high-pressure shaft rotation speed at full throttle.

5. The twin-spool bypass turbojet engine according to claim 1, wherein the applied mechanical power is performed at an in-flight idling speed.

6. The twin-spool bypass turbojet engine according to claim 1, wherein the electrical energy stored in the electricity storage device powers the electric motor to provide the applied mechanical power to the high-pressure shaft.

7. The twin-spool bypass turbojet engine according to claim 1, wherein, during a normal operation of the turbojet engine, said applied mechanical power is supplied directly to the high-pressure shaft, through the electric motor.

8. The twin-spool bypass turbojet engine according to claim 1, wherein the power application device and the power take-off device are drive shafts which are meshed on at least one of the low-pressure and high-pressure shafts.

9. The twin-spool bypass turbojet engine according to claim 1, wherein the power application device is independent and separate from the power take-off device.

10. The twin-spool bypass turbojet engine according to claim 1, wherein the power take-off device is configured to:
in a first case, when the excess mechanical power is greater than a power requirement of the high-pressure shaft, said excess mechanical power is distributed between a first value chosen by a designer of the twin-spool bypass turbojet engine for improving the surge margin at an operating point; and a second value excess that is sent to the electricity storage device, and
in a second case contrary to the first case, when said excess mechanical power extracted on the low-pressure shaft is less that the first value, a quantity of energy is destocked from the electricity storage device for a transmission of said quantity of energy to the electric motor.

\* \* \* \* \*